UNITED STATES PATENT OFFICE.

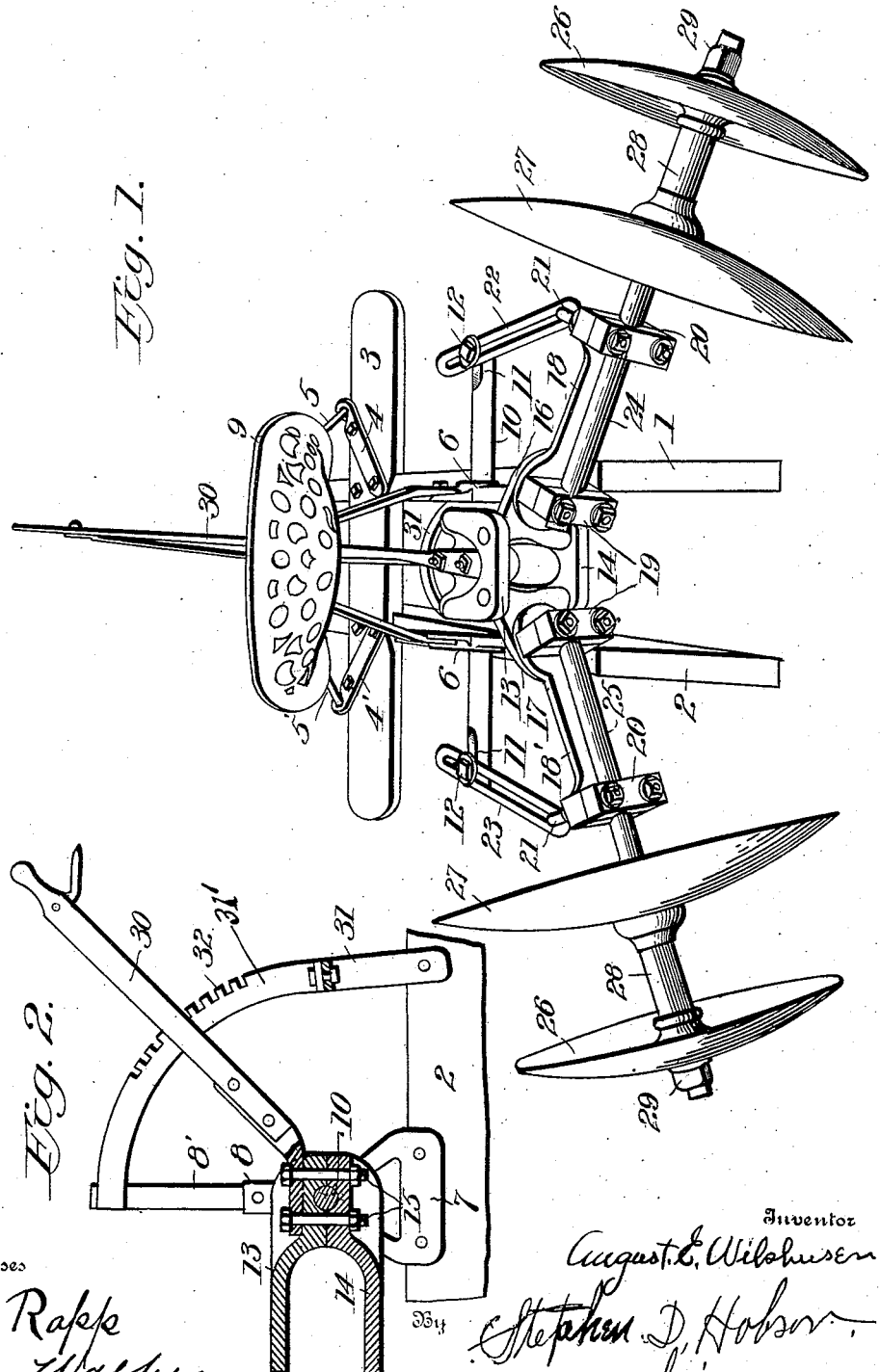

AUGUST E. WILSHUSEN, OF STAFFORD, KANSAS.

LISTER-CULTIVATOR.

No. 855,372.  Specification of Letters Patent.  Patented May 28, 1907.

Application filed May 13, 1905. Serial No. 260,275.

*To all whom it may concern:*

Be it known that I, AUGUST E. WILSHUSEN, a citizen of the United States, residing at Stafford, in the county of Stafford and State of Kansas, have invented new and useful Improvements in Lister-Cultivators, of which the following is a specification.

My invention relates to lister cultivators and more particularly to lister straddle row cultivators which are adapted to straddle the row of growing plants, and work the soil on each side of the plants.

The object of my invention is to provide a lister cultivator having a series of disk soil workers arranged laterally on each side of the runners.

Furthermore, the object of the invention is to provide a lister cultivator having the disks bearing axle supported by a central clamping device secured on the shaft which is secured transversely the runners.

Furthermore, the object of the invention is to provide a disk lister having means for adjusting the disks rearwardly or frontwardly and also provided with a lever for raising and lowering the entire series of disks in passing over clods, stones, or an obstruction which may happen to be in the path of the cultivator.

With the above and other objects in view, the invention consists in the details of construction and in the arrangement and combination of parts to be hereinafter more fully described and particularly pointed out in the claims.

In describing the invention in detail, reference will be had to the accompanying drawing, forming a part of this specification, in which like characters denote corresponding parts in the several views and in which:—

Figure 1 is a rear view of my improved cultivator. Fig. 2 is a detail view of the clamping device.

In the drawings 1 and 2 indicate the runners upon which the disks are supported and which may be of wood, iron, or steel and while I have shown a preferred form made of wood, I do not limit myself to runners made of wood as any suitable material may be used. The runners are connected by a cross-piece 3, said cross-piece extends a predetermined distance laterally from the outer side surface of each runner and at each end I secure plates 4 4' to which links 5 5' are connected and said links form means for securing the whiffletree thereto, and besides providing means for securing the plates 4 4', the ends of the cross-piece provide a rest for the feet of the operator.

On each runner, about midway their longitudinal length, I secure brackets 6. 6. upon the upper edge surface of the runners. The brackets are each provided with a flange 7 (shown in Fig. 2.) which is formed integral with the bracket, and which is adapted to extend over the side surface of the runner and is secured to the runner by means of bolts or rivets. I also provide the brackets 6, 6, with an upright portion 8, to which legs 8' are secured, said legs supporting a seat 9. I also provide each of the brackets 6 6. with a central aperture in which a shaft 10 is secured, said shaft extending a predetermined distance laterally from the outer side surface of the runners and provided with a flat end surface 11, in which bolts 12 are threaded.

A clamp, comprising two sections 13 and 14 is rigidly secured on the shaft 10 by means of bolts 15. It will be noted that the clamp terminates in extending end portions between which I pivot wings 16 and 17.

Plates 18 and 18' which support bearing boxes 19 and 20 are secured to the wings 16 and 17 respectively, by means of bolts, and it is here to be noticed, that the upper bolt in the bearing box, nearest the disks, is provided with a hooked shaped end 21 to which links 22 and 23 are secured, said links having their opposite ends connected to the flat end portion 11 of the shaft 10 by means of the bolts 12.

The bearing boxes 19 and 20 comprise two sections and are preferably made of wood, but may be of any suitable material. Rotatably mounted in the bearing boxes 19 and 20 are disk axles 24 and 25.

On the outer ends of the disk axles, I secure disks 26 and 27, said disks being held apart by means of a sleeve 28. The disks are secured to the axles 24 and 25 by nuts 29 threaded on the outer ends of said axles.

The raising and lowering means, comprises a lever 30 which is secured on the clamp by means of the same bolts, 15 which secure the clamp to the axle. I secure an arch 31 to each runner, immediately in front of the brackets 6 6, and to the arch I secure a brace 31' having its opposite end connected to the legs 8' '8. This brace is provided with teeth 32, in which a pawl (not shown) carried by the lever engages, in order to hold the disks at any desired elevation.

The elevation of the entire series of disks is controlled by the lever 30. As it will be noticed, that the axle 10 is adapted to move in the apertures of the brackets 6. 6. and the clamp being rigidly secured to said axle, when the lever is moved in either direction, it will cause a corresponding movement of the disks. The links 23 provide means for extending the disk carrying axle at any angle to the runners, desired by the operator.

The construction, operation and advantages, will it is thought be understood from the foregoing description, it being noted that various changes may be made in the proportion and details of construction, without departing from the scope of my invention.

Having fully described my invention, what I claim as new and desire to secure by Letters Patent, is:—

1. In a lister cultivator, a pair of runners, brackets rigidly secured on the runners, a clamp rigidly secured on an axle carried by the brackets, wings pivoted to the outer ends of the clamp, plates provided with bearing boxes secured to the wings, disk carrying axles rotatably mounted in the bearing boxes, means for adjusting laterally the disks carrying axles and means for raising and lowering the disks, substantially as described.

2. In a lister cultivator, a pair of parallel runners connected by a cross piece, brackets rigidly secured to the runners, an axle provided with a flat end portion carried by the brackets, a clamp comprising two sections, rigidly secured on the axle, wings pivoted between the free ends of the clamp, plates provided with bearing boxes secured to the wings, disk carrying axles rotatably mounted in the bearing boxes, disks mounted on the disk carrying axles, means for raising and lowering the entire series of disks and means for adjusting the disks at an angle to the runners, as and for the purpose described.

3. In a lister cultivator, a pair of parallel runners, said runners being connected by a cross piece, brackets provided with a flange secured to the runners, said brackets being provided with apertures, an axle mounted in the apertures of the brackets, said axle having flat end portions, a clamp comprising two sections rigidly secured on the axle, wings pivotally mounted between the outer ends of the sections comprising the clamp, plates provided with bearing boxes bolted to each wing, disk carrying axles rotatably mounted in the bearing boxes, disks mounted on the disk axle, sleeves arranged between the disk, means for preventing the disks from accidentally leaving the disk axle, a link having one end secured to the bearing box bolt and its opposite end secured to the first named axle, and means for raising and lowering the entire series of disks substantially as described.

4. In a lister cultivator, a pair of parallel runners, said runners being connected by a cross piece, brackets, provided with a flange secured on the runners, an axle carried by the brackets, a seat suitably secured to the brackets, a clamp comprising two sections rigidly secured on the axle, wings pivotally mounted between the free ends of the clamp sections, plates provided with bearing boxes secured to the wings, disk carrying axles provided with disks secured thereon, means for adjusting the disks at an angle to the runners and means for raising and lowering the disks, as and for the purpose described.

In testimony whereof I affix my signature, in presence of two subscribing witnesses.

AUGUST E. WILSHUSEN.

Witnesses:
A. E. ASHER,
EDWIN E. SCHRADER.